(12) United States Patent
Fu et al.

(10) Patent No.: US 10,564,299 B2
(45) Date of Patent: Feb. 18, 2020

(54) TEMPERATURE COMPENSATION FOR SILICON PHOTOMULTIPLIER BASED DETECTOR

(71) Applicant: General Electric Company, Schenectady, NY (US)

(72) Inventors: Geng Fu, Rexford, NY (US); Jianjun Guo, Ballston Spa, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 389 days.

(21) Appl. No.: 15/145,380

(22) Filed: May 3, 2016

(65) Prior Publication Data
US 2017/0322324 A1 Nov. 9, 2017

(51) Int. Cl.
*G01T 1/24* (2006.01)
*G01T 7/00* (2006.01)

(52) U.S. Cl.
CPC ........... *G01T 1/244* (2013.01); *G01T 1/247* (2013.01); *G01T 1/248* (2013.01); *G01T 7/005* (2013.01)

(58) Field of Classification Search
CPC ................................ G01T 1/248; G01T 1/244
USPC .................................................. 250/370.15
See application file for complete search history.

(56) References Cited

U.S. PATENT DOCUMENTS

| | | | |
|---|---|---|---|
| 6,344,641 B1* | 2/2002 | Blalock | G09G 3/3406 250/205 |
| 7,060,970 B2 | 6/2006 | Cheung et al. | |
| 8,080,792 B2* | 12/2011 | Meir | F41H 3/00 250/330 |
| 8,089,037 B2 | 1/2012 | Schmand et al. | |
| 8,476,594 B2 | 7/2013 | Frach et al. | |
| 8,921,754 B2 | 12/2014 | Frach | |
| 9,024,264 B2 | 5/2015 | Zhang et al. | |
| 9,123,611 B1 | 9/2015 | McKisson et al. | |

(Continued)

OTHER PUBLICATIONS

Licciulli, Francesco. et al., "A Novel Technique for the Stabilization of SiPM Gain Against Temperature Variations", IFEE Transactions on Nuclear Science, vol. 60, No. 2, Apr. 2013, DOI: 10.1109/TNS. 2013.2249527, (pp. 606-611, 6 total pages).

(Continued)

*Primary Examiner* — David P Porta
*Assistant Examiner* — Carolyn Fin
(74) *Attorney, Agent, or Firm* — McCoy Russell LLP

(57) ABSTRACT

A SiPM tile includes SiPM arrays on a detector die, each of the SiPM arrays including a first plurality of microcells and a second plurality of reference microcells dispersed on the die, each reference microcell including an optically-opaque mask, a readout circuit each including a respective charge sensitive amplifier (CSA) connected to one of the reference microcells, each CSA configured to accumulate the dark current of the reference microcell during a selected time window, a hybrid temperature control circuit configured to receive an output signal from each CSA, and to determine the real-time temperature of the die based on the received output signal, to provide the real-time temperature to a temperature compensation and correction control unit that adjusts a cooling/heating system flow provided to the die, the adjustment based on the real-time temperature. A method for compensating the operating temperature variation of the SiPM tile is also disclosed.

15 Claims, 6 Drawing Sheets

(56) References Cited

U.S. PATENT DOCUMENTS 9,854,231 B2 * 12/2017 Guo .................... H04N 17/002
2013/0092842 A1    4/2013 Zhang et al.
2015/0177394 A1    6/2015 Dolinsky et al.

OTHER PUBLICATIONS

Licciulli, Francesco. et al., An Active Compensation System for the Temperature Dependence of SiPM Gain, IEEE Transactions on Nuclear Science, vol. 62, No. 1, Feb. 2015, DOI: 10.1109/TNS. 2015.2388580, (pp. 228-235, 3 total pages).

* cited by examiner

TEMPERATURE COMPENSATION FOR SILICON PHOTOMULTIPLIER BASED DETECTOR

BACKGROUND

For silicon photomultiplier-based (SiPM) detectors, the temperature of the SiPM device can be one of the critical parameters affecting the detector's performance. Even with cooling systems, the actual temperature of a SiPM device can vary due to heat dissipation, non-uniform cooling, environmental changes, and other influences. The temperature variation can degrade detector timing and energy resolution.

One of the temperature effects degrading the timing resolution is a variation in the breakdown voltage and thus gain of the SiPM device. Additional jitter can be introduced by temperature variation in a detector implementing a leading edge discrimination (LED) method for timing measurement. The baseline fluctuation of the SiPM device's dark current can also limit both timing and energy resolution. For a conventional positron emission tomography imaging (PET) detector, a cooling system can reduce the dark noise contribution and stabilize the device temperature. However, conventional cooling systems rely on a thermocouple's indirect measurement of the SiPM microcell temperature by sensing the device's package temperature, which can limit its accuracy.

Real-time measurement and compensation of the temperature is not supported in conventional devices. Another conventional approach generally multiplexes the output signal of several pixels together, where accuracy is also limited by optical crosstalk. Therefore, this approach cannot take into consideration non-uniformity of each device either.

DETAILED DESCRIPTION

Embodying systems and methods provide an accurate temperature compensation and control module for a SiPM-based detector. The module comprises a plurality of reference microcells integrated with the SiPM pixels on the same die, and operated at the same over-voltage in Geiger mode. These reference microcells are blind to optical photons. Each reference microcell, and its corresponding circuit, includes a charge sensitive amplifier (CSA) to accumulate the dark current in a selected time window into substantial quantity with improved signal to noise ratio for subsequent measurement.

Figure 1:
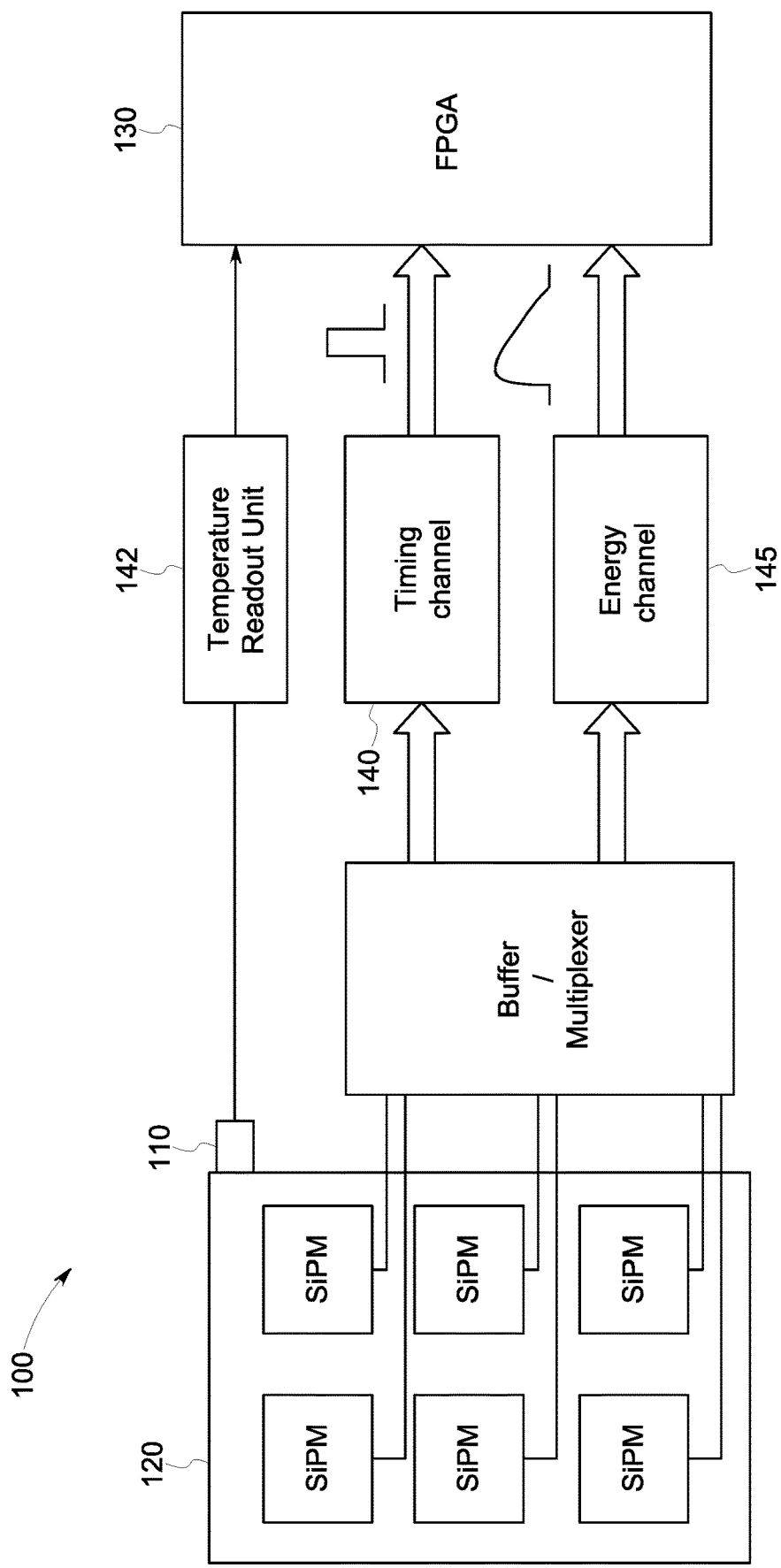
FIG. 1 schematically depicts a conventional silicon photomultiplier based detector.

FIG. 1 schematically depicts conventional SiPM-based detector 100. This conventional detector includes thermocouple 110 and temperature readout unit 142 to measure the package temperature of SiPM tile 120. Temperature values are provided to field programmable gate array (FPGA) 130. The reported device temperature is used to compensate signals from timing channel 140, and energy channel 145.

Figure 2A:
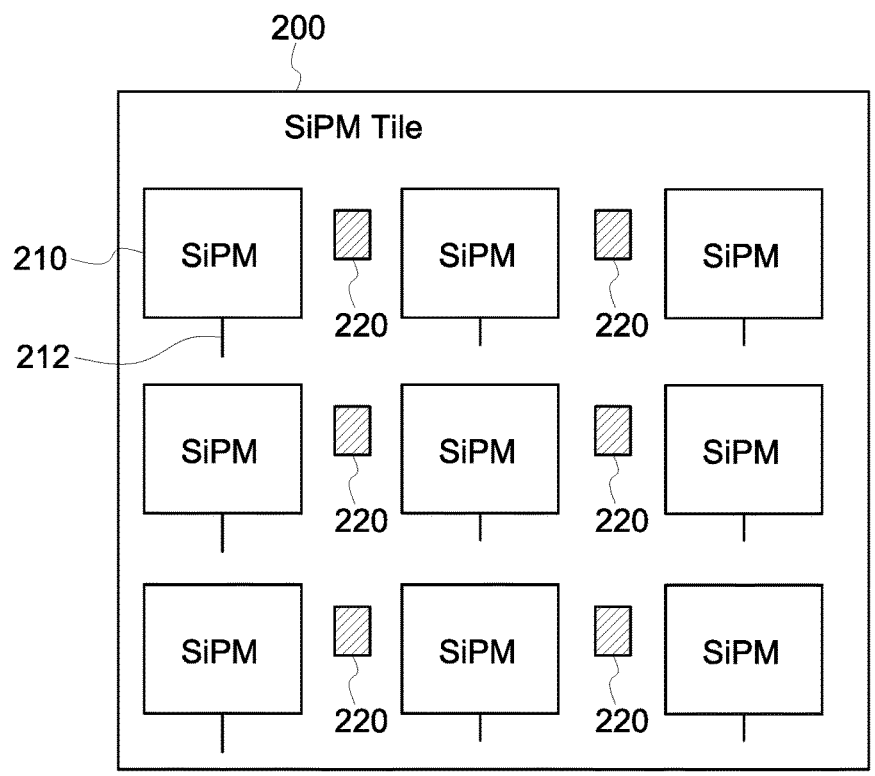
FIGS. 2A-2B each depict a silicon photomultiplier tile in accordance with embodiments.
Figure 2B:
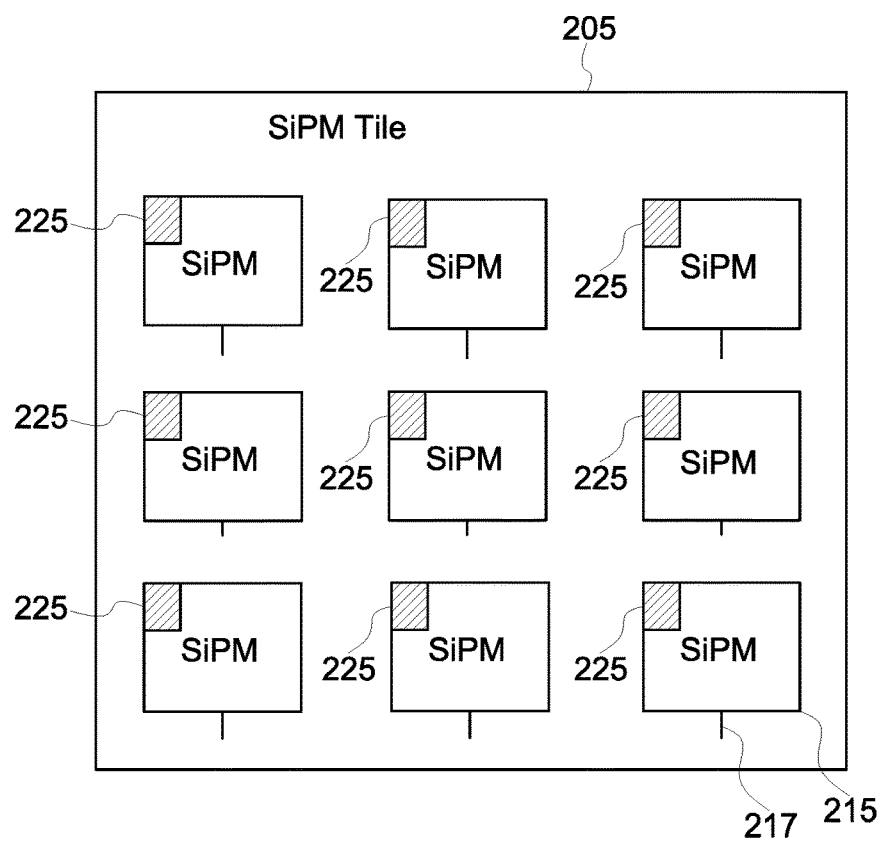

FIG. 2A depicts silicon photomultiplier tile 200 in accordance with embodiments. SiPM tile 200 includes a plurality of SiPM pixel arrays 210, each of which is composed of multiple microcells. In accordance with embodiments, a plurality of respective reference microcells 220 are dispersed on the die in gaps between, and/or among, the pixel arrays. FIG. 2B depicts silicon photomultiplier tile 205 in accordance with embodiments. SiPM tile 205 includes a plurality of SiPM pixel arrays 215, each of which is composed of multiple microcells. In accordance with embodiments, a plurality of respective reference microcells 225 are integrated within the pixel arrays on the die.

Reference microcells 220, 225 provide a measure of dark current on the same die as the SiPM detector microcells. This measure of dark current can be obtained during scanning activity, and used to compensate for dark current contribution and monitor and control the temperature variation. Each respective SiPM pixel array 210, 215 is in communication with external circuitry along respective signal/bus line 212, 217.

When the SiPM device is applied in its multiplication region, the breakdown voltage and dark count rate are sensitive to temperature (and temperature variation), which can lead to variation in the output signal baseline and gain. In accordance with embodiments, performance is improved with the placement of reference microcells on the same die to characterize the temperature variation for compensation and/or correction of the output signal in real-time. In accordance with embodiments, the reference microcells are shielded from optical photons by an optical mask.

Figure 3:
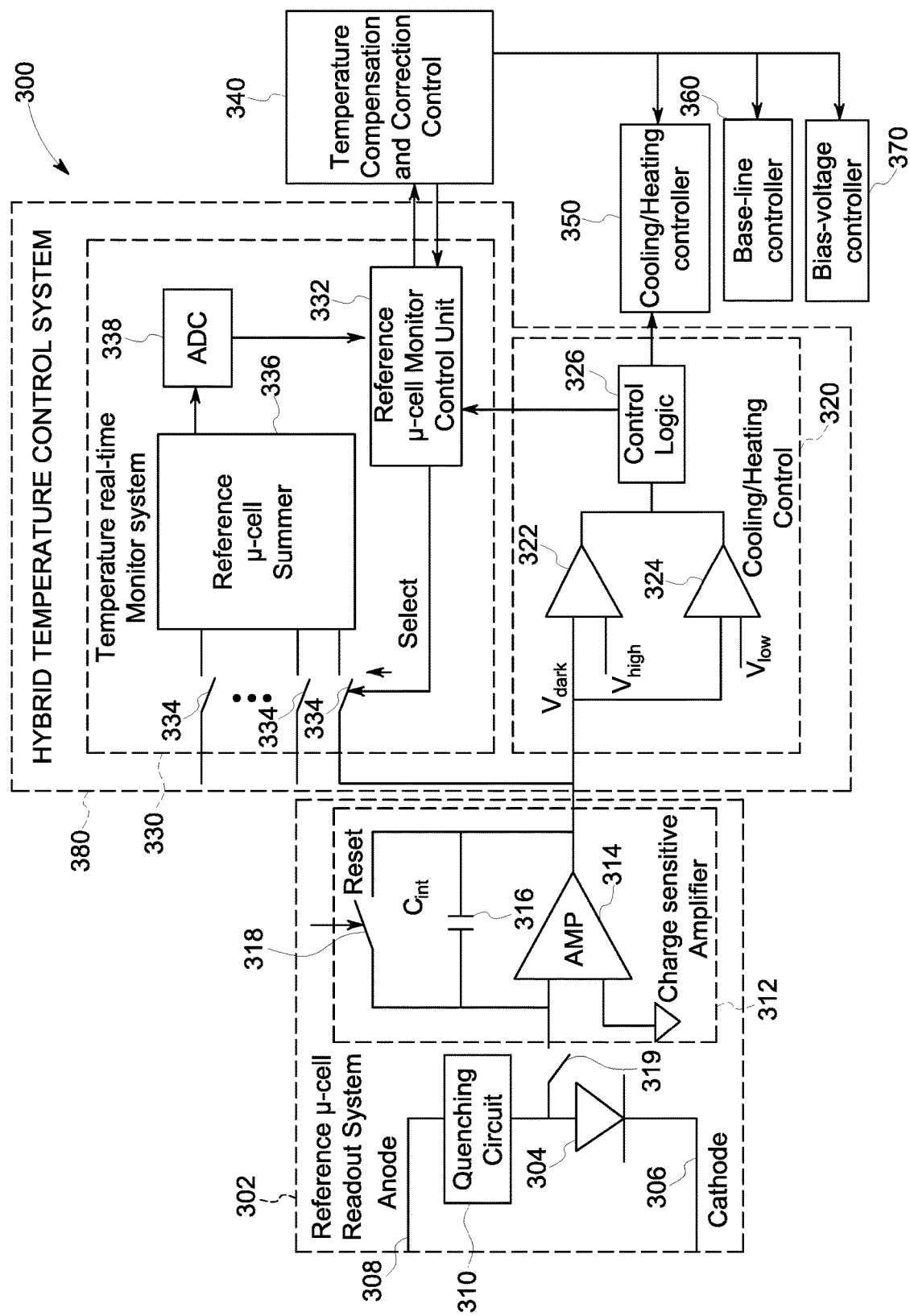
FIG. 3 schematically depicts a control circuit for reference microcells in accordance with embodiments.

FIG. 3 schematically depicts reference microcell control circuit 300 in accordance with embodiments. Each reference microcell readout system 302 can include a single photon avalanche diode 304 (SPAD) operated in Geiger mode, and has an associated cathode 306 and anode 308. Quenching circuitry 310 in the depicted model can include, for example, a quench resistor and parasitic quench capacitor.

In accordance with embodiments, a designated charge sensitive amplifier (CSA) 312 is coupled to the temperature sensing (reference) microcell through sense switch 319. This configuration greatly improves temperature-sensing accuracy while offering the capability of real-time monitoring and compensating for both local and tile temperature variation. The CSA includes amplifier 314, integration capacitance (Cint) 316, and reset switch 318. The output signal from the SPAD is provided to the CSA while the sense switch 319 is closed. The reset switch is controllable to discharge a voltage representative of an accumulated dark current integrated over time during which the sense switch is closed, once a predefined time period elapses.

In accordance with embodiments, hybrid cooling/heating control system 380 is included to reduce the complexity of the cooling/heating system, and to provide a wider operation temperature range. The accumulated voltage Vdark (representative of the dark current level) is provided to a pair of comparators 322, 324 which compare the accumulated Vdark level to respective preselected voltage levels (Vhigh and Vlow). If the accumulated dark current level indicates that the die's local temperature is within an operating temperature (Top) range (for example, about Top±3° C.), no adjustment to the cooling/heating flow is needed at that time. If the indication is that the die's local temperature is outside the predetermined Top range, the cooling/heating flow is adjusted.

Figures 4A, 4B:
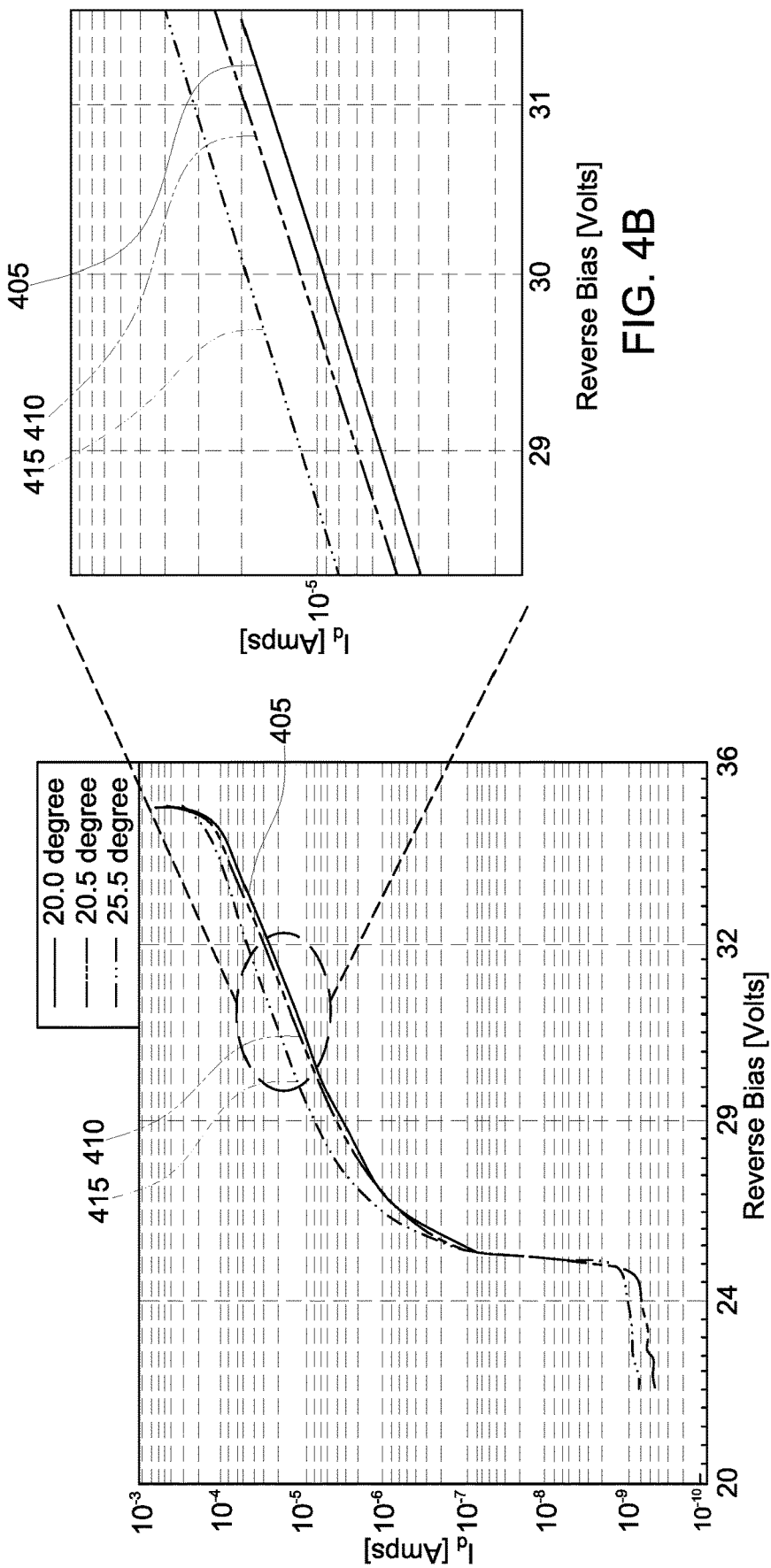
FIG. 4A depicts dark current curves at various temperatures in a silicon photomultiplier device in accordance with embodiments.
FIG. 4B depicts an exploded view of a portion of the curves of FIG. 4A.
Figure 5:
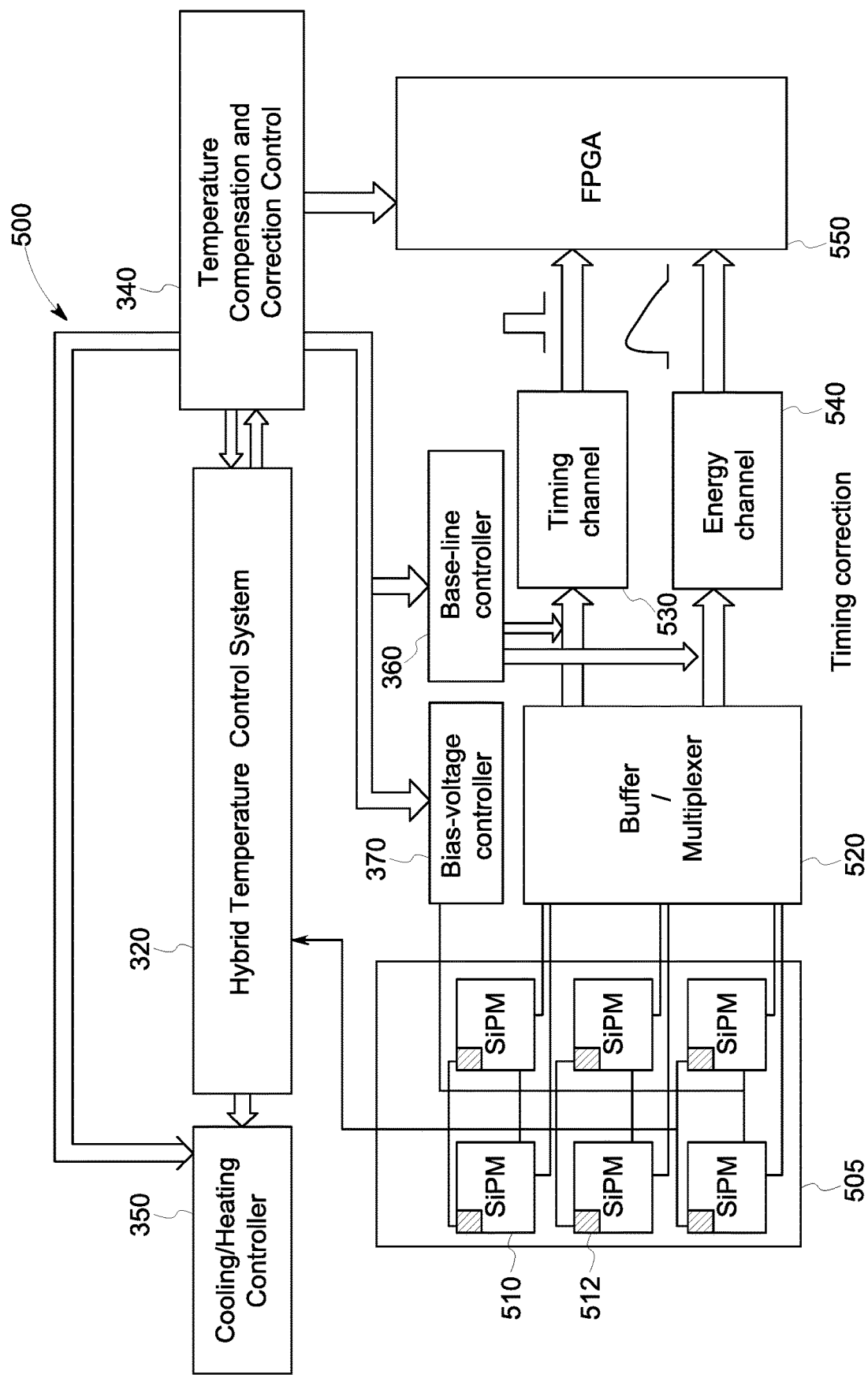
FIG. 5 schematically depicts a temperature compensation circuit for a silicon photomultiplier tile in accordance with embodiments.

The temperature associated with a particular dark current signal level can be derived from known data (e.g., via a look-up table and/or by interpolation). FIG. 4A depicts dark current (Id) curves 405, 410, 415 at various temperatures (e.g., respectively 20.0° C., 20.5° C., and 25.5° C.) in a silicon photomultiplier device in accordance with embodiments. FIG. 4B depicts an exploded view of a portion of the curves of FIG. 4A. As can be observed from FIGS. 4A-4B, Id curves 405, 410, 415 are temperature dependent when the SiPM device is reverse-biased. A look-up table can be stored in a memory unit accessible to, or within, FPGA 550 (FIG. 5). Alternatively, data can be interpolated by FPGA 550 using linear (or other approximating) equations.

With reference to FIG. 3, temperature real-time monitor system 330 can select and measure a single reference microcell signal (representing the local temperature), or a summed signal from multiple reference microcells (representing the average of the die temperature). Reference microcell monitor control unit 332 is provided with a control signal from control unit 340. This control signal instructs whether a local temperature, or a tile temperature is to be monitored. Reference microcell monitor control unit 332 enables one or more input switch(es) 334, which provides dark current signal from one or more reference microcells to summer 336. The output of summer 336 is converted by analog-to-digital (ADC) converter 338, which provides a result back to reference microcell monitor control unit 332.

With the real-time update of operation temperature status (from control logic unit 326) and the ADC 338 results, reference microcell monitor control unit 332 makes an adjustment on CSA accumulation time for reference microcell dark current signal. Reference microcell monitor control unit 332 also can determine the selection of reference microcells for local or tile temperature measurement.

When Vdark is lower than predetermined threshold voltage Vlow (i.e., the local temperature is lower than the operation temperature range), a long accumulation time could be controlled by a reset signal from action of reset switch 318. Similarly, a short accumulation time is capable of providing adequate signal to noise ratio for the sequent ADC measurement when Vdark is higher than Vhigh. When Vdark is between the range of Vlow and Vhigh, the cooling/heating system could work in a power-saving mode or sleep mode. The local and tile temperature would be measured in selectable sequence by temperature real-time monitor system 330. Then the ADC results are transferred to temperature compensation and correction control unit 340.

When adjustment is needed, temperature compensation and correction control unit 340 provides signals to cooling/heating controller 350, base-line control unit 360, and bias-voltage control unit 370. The cooling/heating system can, depending on the situation, cool or heat the SiPM tile by adjusting a cooling and/or heating flow to the tile. The base-line control unit can make adjustments to the signal baseline of both energy and timing channels; and the bias-voltage control unit can adjust the bias-voltage of the SiPMs.

FIG. 5 schematically depicts temperature compensation circuit 500 for SiPM tile 505 in accordance with embodiments. SiPM tile 505 includes a plurality of SiPM pixel arrays 510, each of which is composed of multiple microcells. In accordance with embodiments, included in each of the SiPM pixel arrays is reference microcell 512. Each of the reference microcells includes an optically-opaque mask to shield the reference microcell from optical photons.

The reference microcells can be dispersed on the die in gaps between, and/or among, the pixel arrays (FIG. 2A); or integrated within the pixel arrays (FIG. 2B). For illustrative purposes only, reference microcells 512 are shown within the pixel arrays. As disclosed above with regard to FIG. 3, the outputs of reference microcell readout system 302 are provided both to cooling/heating control system 320 and to temperature real-time monitor system 330. Together, cooling/heating control system 320 and temperature real-time monitor system 330 form hybrid temperature control system 380.

An output from each SiPM pixel array 510 is provided to buffer/multiplexer 520. The buffer/multiplexer can include impedance matching networks to preserve the signal integrity of the SiPM pixel array output, along with a summer to combine the outputs for further processing—e.g., time stamping, energy readout, crystal mapping for PET application, etc. A bias voltage signal is provided from bias-voltage control unit 370 to each of the SiPM pixel arrays. The summed signal is used by both timing channel 530 (with short shaping time constant) and energy channel 540 (with long shaping time constant) for subsequent timing and energy measurement. Base-line control unit 360 provides an offset value to both timing channel 530 and energy channel 540. This offset value is determined by temperature compensation and correction control 340 to compensates for effects of the dark current variation.

Figure 6:
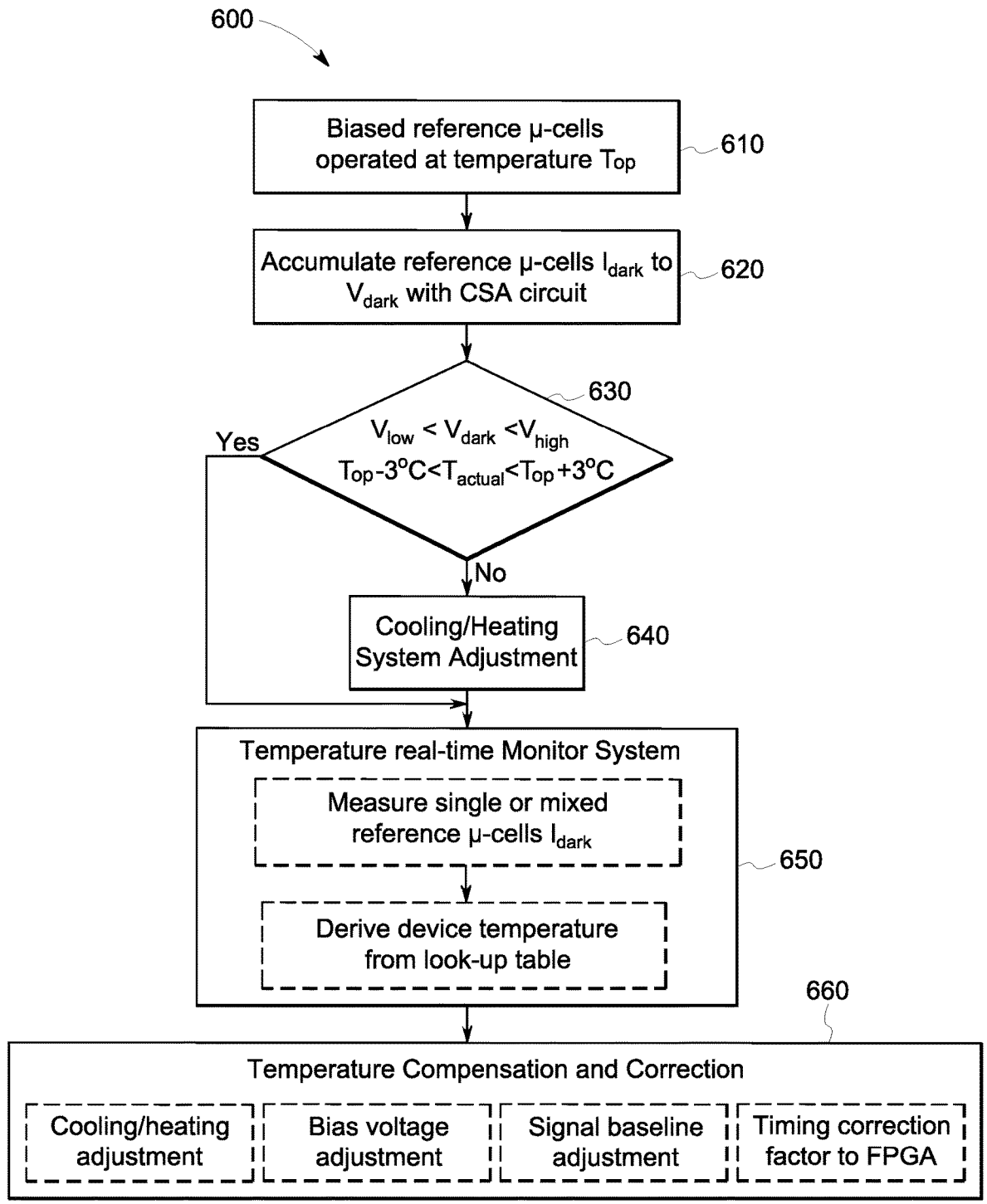
FIG. 6 depicts a temperature control process for silicon photomultiplier based detector in accordance with embodiments.

FIG. 6 depicts temperature control process 600 for SiPM tile 505 in accordance with embodiments. At step 610, reference microcells within the SiPM pixel array are provided with the same bias voltage as the SiPM pixel array. In accordance with embodiments, these reference microcells are optically masked from optical photons. A respective CSA, which is allocated to each reference microcell, accumulates, step 620, a voltage (Vdark) representative of the dark current Idark flowing from the reference microcell.

At step 630, a determination is made as to whether voltage Vdark is within a range defined by predetermined threshold voltages Vlow and Vhigh. Resultantly a determination is also made as to whether the present operating temperature of the reference microcell is within a predetermined operating temperature (Top) range.

If the voltage Vdark is not within the predetermined range, which means the present operating temperature is out of range, then process 600 continues to step 640, where a cooling/heating system could work in full power mode, and a corresponding adjustment is made. If the dark voltage Vdark and the present operating temperature are within their predetermined ranges, process 600 continues at step 650, where the real-time temperature of the SiPM tile is monitored. In accordance with various implementations, the real-time temperature monitor can be done continuously, or at discrete intervals. The temperature could be derived from look-up table or interpolation values based on measured dark current of single reference microcell or selectable microcells. Both local and die temperature information is utilized to determine the temperature compensation and cooling/heating system adjustment. A bias-voltage, a signal baseline, and/or a timing correction factor can be provided, step 660, to temperature compensation circuit 500.

By adjusting the bias-voltage and/or signal baseline of SiPM microcells, embodying systems and methods can compensate for the temperature variation's impact on the output signal of the microcells. This temperature variation is real-time monitored and compensated by adjusting the over-voltage of each SiPM pixel, and the baseline of timing and energy channel. The non-uniformity and variation of detector temperature is saved during the scanning, and then this data can be used to post-process the energy and timing information of each radiation event. This post-processing can be performed by the FPGA (or an application specific integrated circuit, a microprocessor, etc.)

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A silicon photomultiplier tile comprising:
   a plurality of silicon photomultiplier arrays on a detector die, each of the plurality of silicon photomultiplier arrays including a first plurality of microcells;
   a second plurality of reference microcells dispersed on the die, each of the second plurality of reference microcells including an optically-opaque mask;
   a plurality of respective reference microcell readout systems, each including a respective charge sensitive amplifier connected to a respective one of the second plurality of reference microcells, each charge sensitive amplifier configured to accumulate a dark current of the respective one of the second plurality of reference microcells during a selected time window and to provide an output signal indicative of the dark current accumulated during the selected time window;
   a hybrid temperature control system configured to receive the output signal from each respective charge sensitive amplifier, to sum output signals from a plurality of the charge sensitive amplifiers to determine a summed output signal, and to determine a real-time temperature of at least one of the reference microcells based on the summed output signal; and
   a temperature compensation and correction control unit configured to adjust a cooling/heating controller to selectively heat and/or cool the die based on the real-time temperature of the at least one of the reference microcells.

2. The silicon photomultiplier tile of claim 1, wherein at least one of the second plurality of reference microcells is dispersed within one of the silicon photomultiplier arrays.

3. The silicon photomultiplier tile of claim 1, wherein each of the second plurality of reference microcells includes a single photon avalanche diode configured to provide a current pulse, and the charge sensitive amplifier circuit is configured to accumulate a quantity of current to increase a signal to noise ratio for a subsequent measurement.

4. The silicon photomultiplier tile of claim 3, wherein the charge sensitive amplifier circuit includes:
   an amplifier;
   an integration capacitor connected as feedback between an input and output of the amplifier; and
   a reset switch remotely controlled to discharge the integration capacitor after an adjustable time period.

5. The silicon photomultiplier tile of claim 3, wherein the current pulse representative of a dark event is generated by the single photon avalanche diode.

6. The silicon photomultiplier tile of claim 1, wherein the temperature compensation and correction control unit is configured to place the cooling/heating system in one of a power-saving mode and a full power mode based on the real-time temperature of the at least one of the reference microcells.

7. The silicon photomultiplier tile of claim 6, wherein the hybrid temperature control system includes:
   a cooling/heating control system, having a pair of comparators configured to determine if a voltage of an output signal received from one of the plurality of respective reference microcell readout systems is within a predetermined voltage range indicative of an operating temperature range; and
   a temperature real-time monitor system including a reference microcell summer configured to perform the summation of the output signals from the plurality of the charge sensitive amplifiers to determine the summed output signal, and an analog-to-digital convertor configured to convert the summed output signal to a digital signal;
   wherein the temperature compensation and correction control unit is configured to provide control signals to adjust the cooling/heating controller configured to selectively heat and/or cool the die based on the real-time temperature of the at least one of the reference microcells, to adjust a bias-voltage control unit configured to adjust a bias voltage provided to the first plurality of microcells, and to adjust a base-line control unit configured to provide an offset value to both an energy channel and a timing channel.

8. The silicon photomultiplier tile of claim 7, wherein the cooling/heating control system is configured to operate in the power-saving mode when the output signal received from the one of the plurality of respective reference microcell readout systems is within the operating temperature range, and to operate in the full power mode when the output signal received from the one of the plurality of respective reference microcell readout systems is not within the operating temperature range.

9. The silicon photomultiplier tile of claim 1, further comprising:
   a buffer/multiplexer unit configured to receive an output from each of the plurality of silicon photomultiplier arrays;
   the buffer/multiplexer unit configured to separate the output into a timing channel pulse representative of a time-of-arrival of a radiation event, and an energy channel pulse representative of an energy level associated with the radiation event; and
   a field programmable gate array configured to receive information from the temperature compensation and correction control unit, the timing channel pulse, and the energy channel pulse.

10. The silicon photomultiplier tile of claim 9, wherein the field programmable gate array is configured to create an offset value from one of a look-up table and an interpolation calculation, and to provide the offset value to a base-line control unit.

11. The silicon photomultiplier tile of claim 9, wherein the field programmable gate array is configured to utilize the determined operating temperature in real-time to generate a timing correction factor.

12. The silicon photomultiplier of claim 1, wherein each respective charge sensitive amplifier is connected to the respective one of the second plurality of reference microcells by a respective sense switch.

13. The silicon photomultiplier of claim 12, wherein the sense switch is configured to operate over a selected time window.

14. The silicon photomultiplier tile of claim 1, wherein at least one of the second plurality of reference microcells is dispersed adjacent to one of the silicon photomultiplier arrays.

15. The silicon photomultiplier tile of claim 1, wherein at least one of the second plurality of reference microcells is dispersed between the plurality of silicon photomultiplier arrays.

* * * * *